(12) United States Patent
Ko et al.

(10) Patent No.: US 11,785,600 B2
(45) Date of Patent: *Oct. 10, 2023

(54) METHOD FOR TRANSMITTING CONTROL INFORMATION IN WIRELESS COMMUNICATION SYSTEMS

(71) Applicant: Electronics and Telecommunications Research Institute, Daejeon (KR)

(72) Inventors: Young-Jo Ko, Daejeon (KR); Hyeong-Geun Park, Daejeon (KR); Il-Gyu Kim, Okcheon-gun (KR); Kapseok Chang, Daejeon (KR); Hyoseok Yi, Daejeon (KR); Young-Hoon Kim, Daejeon (KR); Seung-Chan Bang, Daejeon (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 156 days.

This patent is subject to a terminal disclaimer.

(21) Appl. No.: 17/169,409

(22) Filed: Feb. 6, 2021

(65) Prior Publication Data

US 2021/0160847 A1    May 27, 2021

Related U.S. Application Data

(63) Continuation of application No. 16/253,260, filed on Jan. 22, 2019, now Pat. No. 10,917,877, which is a
(Continued)

(30) Foreign Application Priority Data

Jun. 21, 2007 (KR) .................. 10-2007-0060852
Aug. 8, 2007 (KR) .................. 10-2007-0079785
Jun. 23, 2008 (KR) .................. 10-2008-0058985

(51) Int. Cl.
*H04W 72/04* (2023.01)
*H04J 13/00* (2011.01)
(Continued)

(52) U.S. Cl.
CPC ......... *H04W 72/20* (2023.01); *H04J 13/0048* (2013.01); *H04J 13/18* (2013.01);
(Continued)

(58) Field of Classification Search
CPC .............. H04W 72/20; H04W 72/0466; H04J 13/0048; H04J 13/18; H04J 13/0062;
(Continued)

(56) References Cited

U.S. PATENT DOCUMENTS 6,567,482 B1 * 5/2003 Popovic' .............. H04B 1/7093
                                                            375/152
6,930,992 B2    8/2005 Qian et al.
(Continued)

FOREIGN PATENT DOCUMENTS

CN         1640035 A      7/2005
CN        101116300 A     1/2008
(Continued)

OTHER PUBLICATIONS

Nokia; "ACK/NACK coverage in the absence of UL data", 3GPP TSG RAN WG1 Meeting #47bis, Sorrento, Italy, Jan. 15-19, 2007; R-070393; 4 pages.
(Continued)

*Primary Examiner* — Eunsook Choi

(57) ABSTRACT

When a plurality of terminals share the same resources in a wireless communication system, and when control information such as acknowledgement/negative acknowledgement (ACK/NAK) information or scheduling information is transmitted, a method of efficiently performing code division multiplexing (CDM) is required to distinguish the plurality
(Continued)

of terminals. In particular, it is necessary to develop a method by which a code sequence of CDM can be selected and used according to each cell condition. Provided is a method of forming a signal in a wireless communication system in which a plurality of terminals commonly share frequency and time resources. The method includes the operations of receiving condition information in a cell; selecting one of a plurality of time domain orthogonal sequences having different lengths, according to the condition information; and allocating the selected time domain orthogonal sequence to a control signal symbol block.

15 Claims, 6 Drawing Sheets

Related U.S. Application Data continuation of application No. 15/452,541, filed on Mar. 7, 2017, now Pat. No. 10,225,824, which is a continuation of application No. 13/755,497, filed on Jan. 31, 2013, now Pat. No. 9,602,233, which is a continuation of application No. 12/664,925, filed as application No. PCT/KR2008/003573 on Jun. 23, 2008, now Pat. No. 8,391,232.

(51) Int. Cl.
| | |
|---|---|
| H04W 72/20 | (2023.01) |
| H04L 1/00 | (2006.01) |
| H04L 5/00 | (2006.01) |
| H04L 23/02 | (2006.01) |
| H04L 1/1607 | (2023.01) |
| H04L 1/1829 | (2023.01) |
| H04J 13/18 | (2011.01) |
| H04W 72/044 | (2023.01) |

(52) U.S. Cl.
CPC ............ *H04L 1/003* (2013.01); *H04L 1/0031* (2013.01); *H04L 1/1692* (2013.01); *H04L 1/1861* (2013.01); *H04L 5/0017* (2013.01); *H04L 23/02* (2013.01); *H04W 72/0466* (2013.01); *H04J 13/0062* (2013.01); *H04L 1/0026* (2013.01); *H04L 1/1607* (2013.01)

(58) Field of Classification Search
CPC ..... H04L 1/003; H04L 1/0031; H04L 1/1692; H04L 1/1861; H04L 5/0017; H04L 23/02; H04L 1/0026; H04L 1/1607; H04L 5/0016; H04L 5/0048; H04L 27/2607; H04L 5/0053
See application file for complete search history.

(56) References Cited

U.S. PATENT DOCUMENTS

| | | |
|---|---|---|
| 6,956,838 B2 | 10/2005 | Ertel et al. |
| 2001/0055294 A1 | 12/2001 | Motoyoshi |
| 2002/0051436 A1* | 5/2002 | Ertel ................ H04W 16/12 370/335 |
| 2002/0136269 A1* | 9/2002 | Kurabe ............... H04J 13/12 375/140 |
| 2002/0146060 A1* | 10/2002 | Ertel ................... H04J 13/16 375/130 |
| 2002/0162073 A1 | 10/2002 | Choi et al. |
| 2002/0172180 A1* | 11/2002 | Hall .................. H01Q 1/246 370/335 |
| 2003/0039205 A1 | 2/2003 | Chiodini |
| 2003/0058788 A1* | 3/2003 | Kim .................. H04J 13/20 370/208 |
| 2003/0103447 A1 | 6/2003 | Thorson et al. |
| 2004/0264363 A1* | 12/2004 | Won .................. H04J 13/18 370/208 |
| 2005/0030964 A1 | 2/2005 | Tiedemann, Jr. et al. |
| 2005/0144209 A1* | 6/2005 | Eo .................... G06F 17/142 708/404 |
| 2006/0056360 A1* | 3/2006 | Parkvall ............... H04B 1/7103 375/138 |
| 2006/0088080 A1* | 4/2006 | Cha .................. H04J 13/14 375/130 |
| 2007/0097927 A1 | 5/2007 | Gorokhov et al. |
| 2008/0043683 A1* | 2/2008 | Kwon ............... H04J 13/0048 370/335 |
| 2008/0137617 A1* | 6/2008 | Michel ................ H04J 13/10 370/335 |
| 2008/0232327 A1* | 9/2008 | Kuroyanagi ....... H04B 1/71055 370/335 |
| 2008/0298488 A1* | 12/2008 | Shen .................. H04W 72/20 375/260 |
| 2008/0298502 A1* | 12/2008 | Xu .................... H04L 5/0051 375/299 |
| 2009/0135791 A1 | 5/2009 | Kawamura et al. |
| 2009/0268602 A1* | 10/2009 | Han .................. H04L 27/2657 370/336 |
| 2010/0046663 A1* | 2/2010 | Han .................. H04L 25/0226 375/295 |
| 2010/0067461 A1* | 3/2010 | Kwak ................ H04L 27/262 370/329 |
| 2010/0135273 A1* | 6/2010 | Kim .................. H04L 1/0033 370/344 |
| 2010/0182976 A1* | 7/2010 | Ko .................... H04J 13/18 370/330 |
| 2010/0254339 A1 | 10/2010 | Ihm et al. |
| 2011/0188465 A1 | 8/2011 | Han et al. |
| 2011/0222393 A1 | 9/2011 | Kwak et al. |
| 2012/0045011 A1 | 2/2012 | Lee et al. |
| 2014/0307675 A1* | 10/2014 | Xu .................... H04W 52/325 370/329 |
| 2017/0208586 A1 | 7/2017 | Kwak |

FOREIGN PATENT DOCUMENTS

| | | |
|---|---|---|
| EP | 1 919 232 A | 5/2008 |
| WO | 2007/023767 A | 3/2007 |
| WO | 2008/041080 A | 4/2008 |

OTHER PUBLICATIONS

Nokia; "Multiplexing of L1/L2 Control Signals between UEs in the absence of UL data", 3GPP TSG RAN WG1 Meeting #47bis Sorrento, Italy, Jan. 15-19, 2007; R1-070394; 5 pages.
NTT DoCoMo et al.; "CDMA-based Multiplexing Method for Multiple ACK/NACK and CQI in E-UTRA Uplink", 3GPP TSG RAN WG1 Meeting #48, St. Louis, USA, Feb. 12-16, 2007 (Original R1-062742) R1-070862, the whole document.
Motorola; "Reference Signal Structure for UL ACK/NACK", 3GPP TSG RAN1 #49, kobe, Japan May 7-11 2-7; R1-072187, 3 pages.
Supplementary European Search Report: dated May 25, 2012; Application No. 08766532.9-1237 /2160858 PCT/KR2008003573.
International Search Report dated Nov. 12, 2008; PCT/KR2008/003573.
Non-final office action dated May 1, 2012 for U.S. Appl. No. 12/664,925.
Notice of Allowance dated Nov. 19, 2012 for U.S. Appl. No. 12/664,925.
Non-final office action dated Aug. 18, 2014 for U.S. Appl. No. 13/755,497.
Non-final office action dated May 5, 2016 for U.S. Appl. No. 13/755,497.
Notice of Allowance dated Nov. 14, 2016 for U.S. Appl. No. 13/755,497.
Non-final office action dated Jan. 24, 2018 for U.S. Appl. No. 15/452,541.
Notice of Allowance dated Oct. 22, 2018 for U.S. Appl. No. 15/452,541.

(56) References Cited

OTHER PUBLICATIONS

Non-final office action dated Apr. 1, 2020 for U.S. Appl. No. 16/253,260.
Notice of Allowance dated Oct. 6, 2020 for U.S. Appl. No. 16/253,260.

* cited by examiner

METHOD FOR TRANSMITTING CONTROL INFORMATION IN WIRELESS COMMUNICATION SYSTEMS

This application is a continuation of U.S. application Ser. No. 16/253,260, filed on Jan. 22, 2019 (now pending), which is a continuation of U.S. application Ser. No. 15/452,541, filed on Mar. 7, 2017 (now U.S. Pat. No. 10,225,824), which is a continuation of U.S. patent application Ser. No. 13/755,497 filed on Jan. 31, 2013 (now U.S. Pat. No. 9,620,233), which is a continuation of U.S. patent application Ser. No. 12/664,925 filed on Dec. 16, 2009 (now U.S. Pat. No. 8,391,232), which is a national stage application under 35 USC 371 of International Application No. PCT/KR2008/003573 filed on Jun. 23, 2008, which claims the benefit of Korean Application No. 10-2008-0058985 filed on Jun. 23, 2008, Korean Application No. 10-2007-0079785 filed on Aug. 8, 2007, and Korean Application No. 10-2007-0060852 filed on Jun. 21, 2007 in the Korean Intellectual Property Office, the content of which are incorporated herein by reference in their entirety.

TECHNICAL FIELD

The present invention relates to a method and apparatus for transmitting control information in a wireless communication system, and more particularly, to a method and apparatus for transmitting control information such as acknowledgement/negative acknowledgement (ACK/NAK) information or scheduling request information by using resources shared by each of a plurality of terminals.

When a plurality of users (terminals) simultaneously use an ACK/NAK channel in a wireless communication system, a code division multiplexing (CDM) technique may be used in the plurality of terminals. In CDM, each of the plurality of terminals transmits a result obtained by multiplying a signal to be transmitted by a spreading code allocated to each of the plurality of terminals.

The present invention relates to identifying signals of a plurality of terminals when the plurality of terminals use a spreading code along a frequency axis and a spreading code along a time axis.

The present invention is derived from research supported by the information Technology (IT) Research & Development (R&D) program of the Ministry of Information and Communication (MIC) and the Institute for Information Technology Advancement (IITA) [Project management No.: 2005-S-404-13, Research title: Research & Development of Radio Transmission Technology for 3G Evolution].

BACKGROUND ART

A receiver transmits an acknowledgement (ACK) signal to a transmitter when the receiver succeeds in demodulating received data, and transmits a negative acknowledgement (NAK) signal to the transmitter when the receiver falls to demodulate the received data. Each of the ACK/NAK signals is expressed as one bit per codeword. The ACK/NAK signals should be enabled to be simultaneously transmitted by a plurality of users (terminals) using given time and frequency resources through multiplexing.

Such multiplexing techniques are classified into frequency division multiplexing (FDM) and code division multiplexing (CDM). FDM is a form of multiplexing where a plurality of different terminals use different time/frequency resources, whereas CDM is a form of multiplexing where a plurality of different terminals use the same time/frequency resources but transmit results obtained by multiplying signals by specific orthogonal codes so that a receiver can identify the plurality of different terminals.

In an uplink, a Zadoff-Chu sequence having an ideal peak to average power ratio (PAPR) is often used. Such a Zadoff-Chu sequence can achieve orthogonality between terminals through a cyclic delay, instead of multiplying a signal by a specific code in a frequency domain.

An uplink ACK/NAK signal is required for a terminal to inform a base station of a successful or unsuccessful (ACK or NAK) receipt of downlink data, and requires one bit per codeword which is used to transmit the downlink data.

FIG. 1 illustrates time/frequency resources used by a terminal to perform uplink ACK/NAK signaling in a 3rd generation partnership projection long term evolution (3GPP LTE) system. Referring to FIG. 1, resources used by one control channel are grouped into two separate resource blocks. Each of the two resource blocks includes N subcarriers along a frequency axis, and 7 orthogonal frequency division multiplexing (OFDM) symbols, which corresponds to one slot, along a time axis. One slot has a time duration of 0.5 ms.

In FIG. 1, a plurality of terminals may commonly use one control channel. That is, a control channel A or a control channel B may be shared by the plurality of terminals.

In this case, in order to identify the plurality of terminals using the same control channel, a specific code sequence is allocated to each of the plurality of terminals. That is, each of the plurality of terminals generates and transmits a signal spread along a frequency axis and a time axis by using its allocated specific code.

FIG. 2 illustrates a code sequence and a symbol transmitted to each of N subcarriers in an ACK/NAK channel occupying a resource block that includes the N subcarriers along a frequency axis and 7 OFDM symbols along a time axis. In FIG. 2, the resource block corresponding to one slot described with reference to FIG. 1 occupies N subcarriers on a frequency axis and includes 7 symbol blocks BL #0 through #6 on a time axis.

When CDM is used to identify signals of a plurality of terminals, a sequence and a symbol may be mapped to each time/frequency resource as illustrated in FIG. 2. In order to identify the signals of the plurality of terminals, a sequence is applied to each of the frequency axis and the time axis. In FIG. 2, a reference signal is used for channel estimation, and a pre-determined signal between a terminal and a base station is transmitted.

The base station estimates a channel by the reference signal, and uses a result of the channel estimation so as to demodulate an ACK/NAK symbol transmitted by a control signal. Each time/frequency resource carrys out a signal multiplied by two or three symbols.

That is, a time/frequency resource on which the reference signal is carded, is obtained by multiplying a frequency axis sequence symbol $C_q^m(k)$ by a time axis sequence symbol $R_i$ ($i=0, 1, 2$). A time/frequency resource on which the control signal is carried, is obtained by multiplying a frequency axis sequence symbol $C_q^m(k)$, a time axis sequence symbol $C_i$ ($i=0, 1, 2, 3$), and an ACK/NAK symbol Q.

In FIG. 2, the frequency axis sequence symbol $C_q^m(k)$ indicates a Zadoff-Chu sequence where $N_zc$ is the length of the Zadoff-Chu sequence applied to a $k_{th}$ subcarrier along the frequency axis, m is a primary index, and q is a cyclic delay index, and is provided by Equation 1.

$$C_q^m(k) = \exp\left[i\frac{2\pi}{N_{ZC}}m\left(\frac{(k-q)(k-q+1)}{2}\right)\right],$$ [Equation 1]

$$k = 0, 1, 2, \ldots, N-1$$

One sequence is applied to each of the reference signal and the control signal along the time axis. That is, a sequence applied to the control signal in FIG. 2 is expressed as $C_0$, $C_1$, $C_2$, and $C_3$. A sequence applied to the reference signal is expressed as $R_0$, $R_1$, and $R_2$.

Currently, 3GPP LTE considers a configuration in which three reference signals per slot are used for an uplink ACK/NAK channel.

Also, in order to identify a plurality of terminals, a Zadoff-Chu sequence is used along a frequency axis, and a discrete Fourier transformation (DFT) vector, a Walsh-Hadamard sequence, or a Zadoff-Chu sequence may be used along a time axis.

DETAILED DESCRIPTION OF THE INVENTION

Technical Problem

Figure 1:
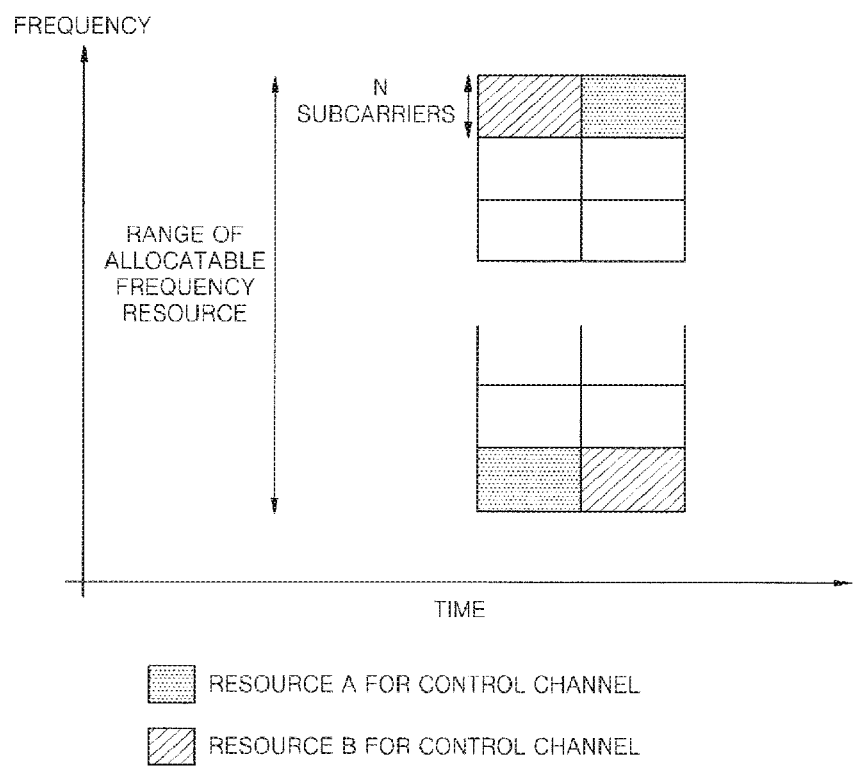
FIG. 1 illustrates time/frequency resources used by a terminal to transmit an uplink acknowledgement/negative acknowledgement (ACK/NAK) signal through a control channel in a $3^{rd}$ generation partnership projection long term evolution (3GPP LTE) system.
Figure 2:
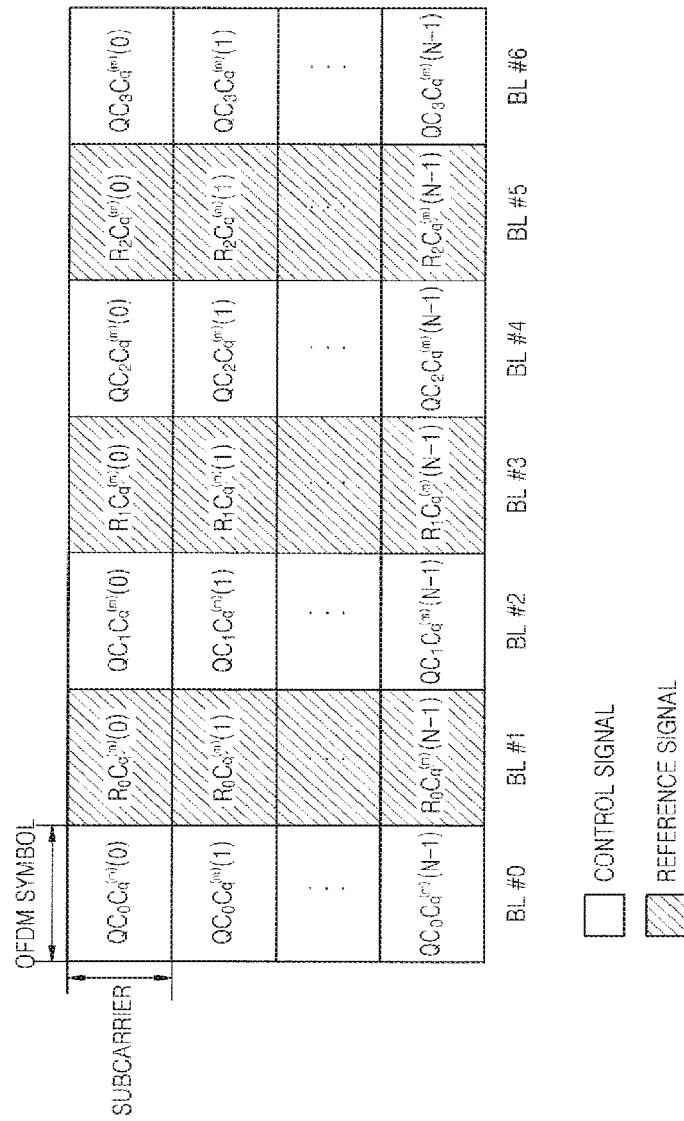
FIG. 2 illustrates a code sequence and a symbol transmitted to each of N subcarriers in an acknowledgement/negative acknowledgement (ACK/NAK) channel occupying a resource block that includes the N subcarriers along a frequency axis and 7 orthogonal frequency division multiplexing (OFDM) symbols along a time axis.

When a plurality of terminals share the same resources in a wireless communication system, and when control information such as acknowledgement/negative acknowledgement (ACK/NAK) information or scheduling information is transmitted, a method of efficiently performing code division multiplexing (CDM) is required to identify the plurality of terminals. In particular, it is necessary to develop a method by which a code sequence of CDM can be selected and used according to each cell condition.

Technical Solution

According to an aspect of the present invention, there is provided a method of selecting a signal in a wireless communication system in which a plurality of terminals commonly use frequency and time resources, the method including the operations of determining condition information in a cell; transmitting information about a code sequence to be selected to the plurality of terminals, according to the condition information in the cell; and selecting one of a plurality of time domain orthogonal sequences having different lengths, according to the condition information in the cell.

According to another aspect of the present invention, there is provided a method of forming a signal in a wireless communication system in which a terminal selects a code according to condition information in a cell, the method including the operations of receiving the condition information in the cell; selecting one of a plurality of time domain orthogonal sequences having different lengths, according to the condition information; and allocating a code of the selected time domain orthogonal sequence to the terminal.

According to another aspect of the present invention, there is provided a method of forming a signal in a wireless communication system in which a terminal allocates an orthogonal code, the method performed by the terminal and including the operations of receiving an orthogonal cover index from a base station, wherein the orthogonal cover index achieves orthogonality with a length of 2 between the terminal and a second terminal sharing the same resources; multiplying control information by a time axis code symbol corresponding to the orthogonal cover index along a time axis; having a cyclic shift index along a frequency axis, wherein the cyclic shift index is the same as that of the second terminal sharing the same resources, and multiplying the control information by a frequency axis code symbol corresponding to the cyclic shift index; and transmitting the control information to the base station.

According to another aspect of the present invention, there is provided a base station apparatus selecting one of a plurality of code sequences having different lengths according to a condition in a cell in a wireless communication system, the base station apparatus including a cell condition determination unit determining the condition of the cell according to a speed condition of terminals in the cell; a code sequence selection information transmitting unit transmitting code sequence selection information, which is determined according to the determined condition of the cell, to the terminal; and a code sequence selection unit selecting a code sequence which is determined according to the determined condition of the cell.

According to another aspect of the present invention, there is provided a terminal apparatus selecting one of a plurality of code sequences having different lengths according to a condition in a cell in a wireless communication system, the terminal apparatus including a code sequence selection information receiving unit receiving code sequence selection information from a base station apparatus, wherein the code sequence selection information constitutes information about a length of a code sequence to be selected; a code sequence selection unit selecting one of the plurality of code sequences having different lengths, according to the received code sequence selection information; and a code sequence allocation unit allocating the selected code sequence to a terminal.

Advantageous Effects

According to the present invention, when a plurality of terminals simultaneously use an acknowledgement/negative acknowledgement (ACK/NAK) channel in a wireless communication system, code division multiplexing (CDM) is performed and a spreading code using all of a frequency axis and a time axis is used, so that the plurality of terminals can be efficiently identified.

MODE OF THE INVENTION

A code allocation method for efficiently identifying a plurality of terminals when they simultaneously use an acknowledgement/negative acknowledgement (ACK/NAK) channel in a wireless communication system according to the present invention will now be described more fully with reference to the accompanying drawings, in which exemplary embodiments of the invention are shown.

Detailed explanation will not be provided when it is determined that detailed explanations about well-known functions and configurations of the present invention may dilute the point of the present invention. Terms used hereinafter are used considering the functions in the present invention and may be changed according to a users or operator's intention or usual practice. Accordingly, the terms will be defined based on the entire content of the description of the present invention.

In the present invention, control information may be an ACK/NACK(NAK) signal, scheduling request information, channel quality indication (COI) Information, precoding matrix indicator (PMI) information, and rank indication (RI) information, but the present invention is not limited thereto.

In embodiments of the present invention, an ACK/NAK signal is described as the control information. However, it will be understood by one of ordinary skill in the art that the embodiments may be applied to transmission of other control information.

In particular, the term "frequency axis code" or "frequency axis code index" used hereinafter is interchangeable with "cyclic shift" or "cyclic shift index," and the term "time axis code" or "time axis code index" used hereinafter is interchangeable with "orthogonal cover" or "orthogonal cover Index".

Also, the term "frequency axis code sequence" used hereinafter has the same meaning as "frequency domain identification sequence" or "frequency domain orthogonal sequence", and the term "time axis code sequence" used hereinafter has the same meaning as "time domain identification sequence" or "time domain orthogonal sequence".

Figure 3:
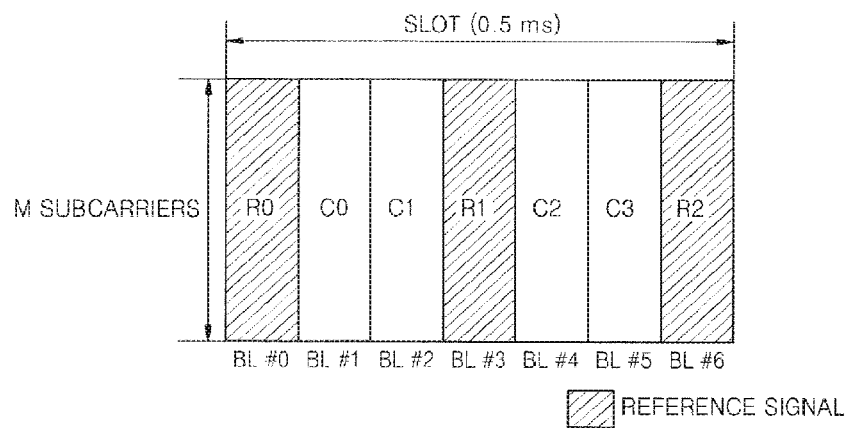
FIG. 3 illustrates a slot structure of an ACK/NAK channel including 3 reference signals per slot, according to an embodiment of the present invention.
Figure 4:
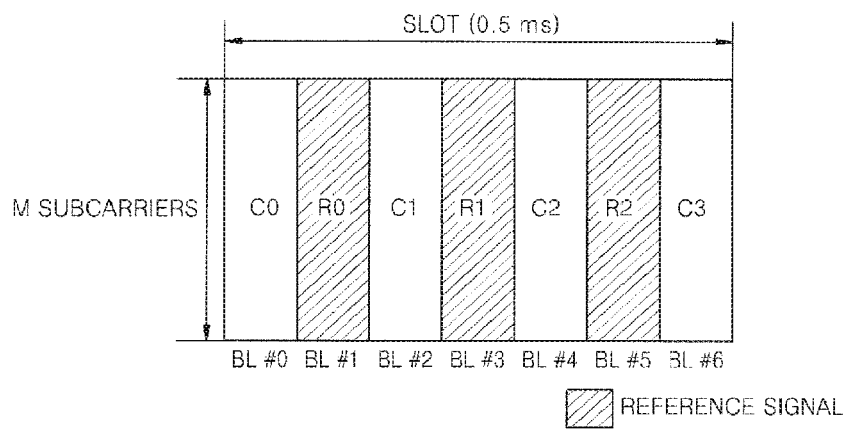
FIG. 4 illustrates a slot structure of an ACK/NAK channel including 3 reference signals per slot, according to another embodiment of the present invention.
Figure 5:
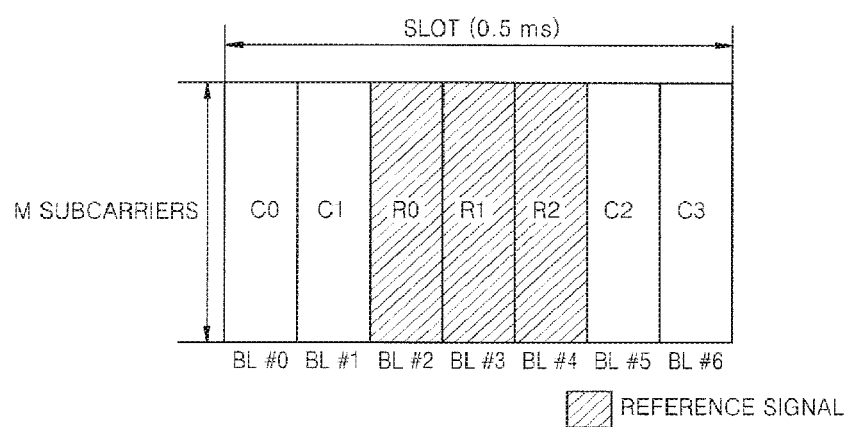
FIG. 5 illustrates a slot structure of an ACK/NAK channel including 3 reference signals per slot, according to another embodiment of the present invention.

FIGS. 3 through 5 illustrate slot structures of an ACK/NAK channel, according to embodiments of the present invention. Referring to FIGS. 3 through 5, one slot includes 3 reference signals and 4 control signals, but the number of reference signals and control signals per slot may be different.

In order to identify signals of a plurality of terminals, a receiver should be able to receive and identify reference signals transmitted by the plurality of terminals, and also should be able to receive and identify control signals transmitted by the plurality of terminals. As described above, a code division multiplexing (CDM) technique using both frequency and time axis resources may be used to identify the signals.

A time axis sequence used for time axis CDM is an orthogonal sequence. When the number of continuous orthogonal frequency division multiplexing (OFDM) symbols along a time axis is $N_t$, a sequence length may be $N_t$, and $N_t$ sequences achieving orthogonality therebetween may be formed. When an $i_t$ sequence is expressed as a row vector $G_i = [C_{i,0}, C_{i,1}, \ldots C_{i,N_t-1}]$, the orthogonality is expressed by Equation 2.

$$G_i \cdot G_j^+ = [C_{i,0}, C_{i,1}, \ldots, C_{i,N_t-1}] \cdot \begin{bmatrix} C_{j,0}^* \\ C_{j,1}^* \\ \vdots \\ C_{j,N_t-1}^* \end{bmatrix} = \sum_{k=0}^{N_t-1} C_{i,k} C_{j,k}^* = N_t \delta_{i,j}$$

$$\text{where } \delta_{i,j} = \begin{cases} 1 & \text{if } i = j \\ 0 & \text{if } i \neq j \end{cases}.$$

[Equation 2]

Theoretically, if the total number of frequency axis resources is M and one slot includes 3 reference signals in FIGS. 3 through 5, a total of Mx3 reference signals may be identified by CDM.

Also, if the total number of frequency axis resources is M and one slot includes 4 control signals in FIGS. 3 through 5, a total of Mx4 control signals may be identified by CDM.

However, since each terminal should transmit at least one reference signal in order for a base station to demodulate a control signal by using the reference signal, the total number of distinguishable terminals is Mx3. In this case, an orthogonal sequence with a spreading factor (SF) of 3 is used for the reference signals, and an orthogonal sequence with an SF of 4 is used for the control signals.

Table 1 shows a Walsh-Hadamard code with a length of 4.

TABLE 1

| Walsh-Hadamard code | | | | |
| --- | --- | --- | --- | --- |
|  | $C_0$ | $C_1$ | $C_2$ | $C_3$ |
| WC0 | 1 | 1 | 1 | 1 |
| WC1 | 1 | −1 | 1 | −1 |
| WC2 | 1 | 1 | −1 | −1 |
| WC3 | −1 | −1 | 1 | 1 |

Since the length of the Walsh-Hadamard code is 4, the Walsh-Hadamard code may be used in the time axis CDM for the control signals. When the total number of distinguishable terminals is Mx3, 3 of 4 sequences may be selected and used. For example, WC0, WC1, and WC2 in Table 1 may be used and WC3 is not used. However, it may be possible not to use one of WC0, WC1, and WC2 but to use the remaining 3 sequences.

The method with reference to Table 1 uses an orthogonal sequence with a length of 3 for all reference signals, and uses an orthogonal sequence with a length of 4 for all control signals, and thus 3 terminals which use the same Zadoff-Chu sequence along a frequency axis can be identified. However, when a terminal has high speed, orthogonality of a sequence used for the reference signals and the control signals is not achieved.

In particular, since the 4 control signals are located far away from each other along the time axis, the 4 control signals are more speed-sensitive. That is, orthogonality is not guaranteed for high-speed terminals. When orthogonality is not achieved, a receiver may not identify signals of the plurality of terminals such that CDM performance substantially deteriorates.

In order to solve such problems, in the case where a cell includes many high-speed terminals, a length of a code sequence used in the time axis CDM for the control signals may be reduced to 2. When the length is reduced to 2, performance at high speed improves, compared to the case when the length is 4. However, the total number of identifiable terminals is reduced from Mx3 to Mx2. Although the total number of identifiable terminals is reduced, the orthogonality is guaranteed so that CDM performance may be improved.

Table 2 shows a case in which a Walsh-Hadamard sequence code with a length of 2 is applied to control signals.

TABLE 2

| Walsh-Hadamard code | | | | |
|---|---|---|---|---|
| | $C_0$ | $C_1$ | $C_2$ | $C_3$ |
| WC0 | 1 | 1 | 1 | 1 |
| WC1 | 1 | −1 | 1 | −1 |

When the Walsh-Hadamard sequence code with the length of 2 is used in the time axis CDM for the control signals, the total number of distinguishable terminals is Mx2. Codes of Table 2 correspond to a subset of codes in Table 1 so that the codes of Table 2 can be implemented without increasing additional complexity.

According to another embodiment of the present invention, two terminals sharing the same resources may receive code sequence information from a base station, wherein, according to the code sequence information, the two terminals have the same cyclic shift along a frequency axis and are allocated an orthogonal code sequence achieving a length of 2 along a time axis. That is, the two terminals may receive information by which the orthogonal code sequence such as a Walsh-Hadamard code with a length of 2 along the time axis may be allocated to the two terminals.

To be more specific, the two terminals using the same resources are allocated the Walsh-Hadamard code with the length of 2 shown in Table 2. Each of the two terminals receives an orthogonal cover index such as WC0 or WC1, and multiplies the orthogonal cover index by control information to be transmitted, such as ACK/NAK control information. By doing so, orthogonality is achieved so as to identify the two terminals.

Orthogonality of a time axis sequence is maintained when a length of the time axis sequence is shorter than a coherence length of a terminal. The higher the speed of the terminal, the shorter the coherence length. Thus, in order to maintain orthogonality among a plurality of high-speed terminals, it is ideal when the length of the time axis sequence for achieving orthogonality is short. Hence, in a cell including many high-speed terminals, it is better to use a code sequence with a length of 2 as shown in Table 2 than to use a code sequence with a length of 4 as shown in Table 1.

At this time, terminals using the same orthogonal code sequence with a length of 2 may be located far away from each other along a frequency axis, so as to avoid interference. Preferably, a minimum distance between each of the terminals may be greater than 2.

Table 3 shows sequence allocation, according to another embodiment of the present invention.

TABLE 3

| Control information signal sequence allocation | | | | |
|---|---|---|---|---|
| Cyclic shift | Orthogonal cover index | | | |
| index | 0 | 1 | 2 | 3 |
| 0 | 1 | 7 | | |
| 1 | | | | |
| 2 | | | 4 | 10 |
| 3 | | | | |
| 4 | 2 | 8 | | |
| 5 | | | | |
| 6 | | | 5 | 11 |
| 7 | | | | |
| 8 | 3 | 9 | | |
| 9 | | | | |
| 10 | | | 6 | 12 |
| 11 | | | | |

Table 3 shows a code sequence allocation for terminals #1 through #12 according to the embodiment of the present invention. Referring to Table 3, it is apparent that terminals #1 and #7, and terminals #2 and #8, which are allocated the same code sequence, are separated as far as 4 with respect to the cyclic shift index. Although terminal #1 and terminal #7 share the same resources, results obtained by multiplying an orthogonal sequence by control information, are transmitted so that a receiver may distinguish terminal #1 from terminal #7.

Figure 6:
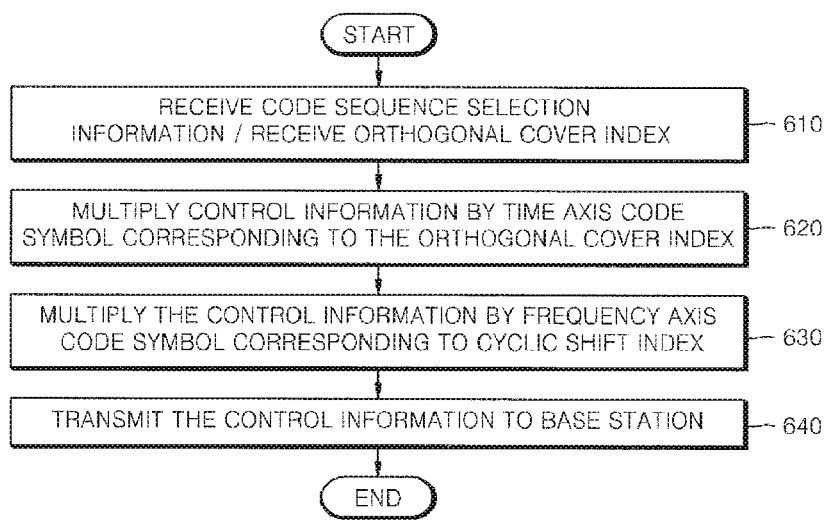
FIG. 6 is a flowchart of a method by which a terminal selectively uses a time axis code sequence achieving orthogonality with a length of 2 or 4, and transmits control information to a base station according to an embodiment of the present invention.

FIG. 6 is a flowchart of a method by which a terminal selectively uses a time axis code sequence achieving orthogonality with a length of 2 or 4, and transmits control information to a base station, according to an embodiment of the present invention.

First, the terminal receives code sequence selection information from the base station (operation 610). The code sequence selection information includes information of the base station which determines a condition in a cell so as to inform the terminal whether to select a time axis code sequence with a short length or to select a time axis code sequence with a relatively long length.

For example, in a case where the cell includes a plurality of high-speed terminals, the base station may inform the terminal to use a Walsh-Hadamard sequence with a length of 2, and may simultaneously inform the terminal of an orthogonal cover index achieving orthogonality with a length of 2. The terminal receives the orthogonal cover index, and multiplies control information by a time axis code symbol corresponding to the orthogonal cover index (operation 620). By doing so, the terminal may be distinguished from other terminals sharing the same cyclic shift index.

After that, the terminal multiplies the control information by a frequency axis code symbol corresponding to the cyclic shift index along a frequency axis (operation 630). Finally, the terminal transmits the control information to the base station (operation 640).

According to the embodiments of the present invention, a discrete Fourier transformation (DFT) code with a length of 3 is used in the time axis CDM for the reference signals. In the time axis CDM for the control signals, one of the code sequences shown in Table 1 and Table 2 is set to be selected according to a cell condition. The base station should inform the terminal of a code length used by the cell. For example, in order to inform the terminal whether the code sequence of Table 1 is used or the code sequence of Table 2 is used, the base station may use 1 bit from broadcasting information in the cell.

According to information having the 1 bit, the terminal may know whether there are Mx3 ACK/NAK channels or Mx2 ACK/NAK channels, and use one of the Mx3 or Mx2 ACK/NAK channels according to a predetermined rule.

In this manner, the terminal receives information about which code sequence is to be used according to the cell condition from the base station, and based on the information, selectively uses a sequence with a length that satisfies the cell condition. That is, in the case where the plurality of high-speed terminals are in the cell, a short length code sequence such as a code sequence with a length of 2 may be used. Conversely, in the case where the cell does not include many high-speed terminals, a long length code sequence such as a code sequence with a length of 4 may be used. By doing so, the number of distinguishable terminals may increase.

Figure 7:
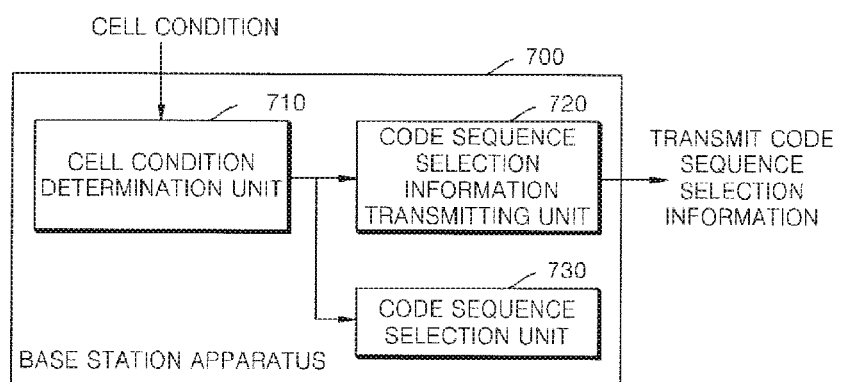
FIG. 7 illustrates a base station apparatus in a wireless communication system, according to an embodiment of the present invention.

FIG. 7 illustrates a base station apparatus 700 to which the method of FIG. 6 is applied, according to an embodiment of the present invention.

Referring to FIG. 7, the base station apparatus 700 according to the current embodiment of the present embodiment includes a cell condition determination unit 710, a code sequence selection information transmitting unit 720, and a code sequence selection unit 730. The cell condition determination unit 710 determines which code sequence is to be used, according to a condition in a cell. As described above, in the case where the cell includes a plurality of high-speed terminals, a short length code sequence may be used. However, in the case where the cell does not have many high-speed terminals, it may be more efficient to use a long length code sequence.

A result of the determination by the cell condition determination unit 710 is shared between the base station apparatus 700 and a terminal so as to use a mutually pre-determined code sequence. The result of the determination by the cell condition determination unit 710 is transmitted to the code sequence selection information transmitting unit 720. The code sequence selection information transmitting unit 720 uses 1 bit from broadcasting information in the cell, thereby informing the terminal of information about which code sequence is to be selected.

It may be possible to pre-determine that when the 1 bit is 0, the code sequence of Table 1 is used, and when the 1 bit is 1, the code sequence of Table 2 is used.

The result of the determination by the cell condition determination unit 710 is also transmitted to the code sequence selection unit 730 in the base station apparatus 700. According to the result of the determination transmitted from the cell condition determination unit 710, the code sequence selection unit 730 selects a code sequence to be used. That is, according to the result of the determination about the condition of the cell, a time axis sequence with a length of 2 or 4 is selected; however, the present invention is not limited to these lengths and various lengths may be selected.

Figure 8:
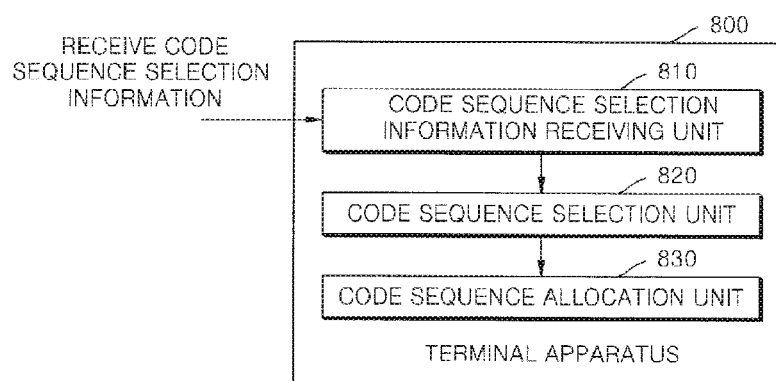
FIG. 8 illustrates a terminal apparatus in a wireless communication system, according to an embodiment of the present invention.

FIG. 8 illustrates a terminal apparatus 800 having a code sequence selection function, according to an embodiment of the present invention. Referring to FIG. 8, the terminal apparatus 800 according to the current embodiment of the present invention includes a code sequence selection information receiving unit 810, a code sequence selection unit 820, and a code sequence allocation unit 830. The terminal apparatus 800 receives code sequence selection information from a base station via the code sequence selection information receiving unit 810. According to the code sequence selection information transmitted from the base station, the terminal apparatus 800 determines a length of a code sequence to be selected by using the code sequence selection unit 820. After that, when the code sequence to be used is determined, the terminal apparatus 800 allocates a code sequence to a terminal by using the code sequence allocation unit 830, wherein the code sequence is pre-determined with the base station.

In this manner, the base station and the terminal can flexibly cope with a change in the cell condition. By selecting and using different lengths of the code sequence according to speed of the terminal in the cell, efficient communication between the base station and the terminal can be achieved.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet).

The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

The invention claimed is:

1. A communication method performed by a terminal, the method comprising:
  receiving, by the terminal, information on cyclic shift;
  generating, by the terminal, a first cyclically shifted sequence based on the information on cyclic shift;
  generating, by the terminal, a first symbol;
  selecting a first sequence from a first set of sequences, wherein the first set of sequences consists of the first sequence (C00, C01, C02, C03), a second sequence (C10, C11, C12, C13) and a third sequence (C20, C21, C22, C23), wherein each of the first, second and third sequences are orthogonal to each other;
  generating, by the terminal, a fourth sequence based on the first symbol, and the first sequence and the first cyclically shifted sequence; and
  transmitting, by the terminal, the fourth sequence to a base station,
  wherein first two elements (C00, C01) of the first sequence are orthogonal to first two elements (C10, C11) of the second sequence, and last two elements (C02, C03) of the first sequence are orthogonal to last two elements (C12, C13) of the second sequence.

2. The method of claim 1, wherein:
the first sequence (C00, C01, C02, C03) comprises W0 (a, a, a, a), and the second sequence (C10, C11, C12, C13) comprises W1 (a, b, a, b), wherein a is a first value and b is a second value different from the first value.

3. The method of claim 2, wherein:
the first two elements (C00, C01) of the first sequence are also orthogonal to first two elements (C20, C21) of the third sequence, and the last two elements (C02, C03) of the first sequence are also orthogonal to last two elements (C22, C23) of the third sequence.

4. The method of claim 1, wherein the fourth sequence is generated by multiplying the first symbol with the first sequence and the first cyclically sifted sequence.

5. The method of claim 1, wherein the first symbol is generated based on acknowledgement/negative-acknowledgement (ACK/NAK) information.

6. A terminal, comprising:
a circuitry which is configured to:
cause the terminal to receive information on cyclic shift;
generate a first cyclically shifted sequence based on the information on cyclic shift;
generate a first symbol;
select a first sequence from a first set of sequences, wherein the first set of sequences consists of the first sequence (C00, C01, C02, C03), a second sequence (C10, C11, C12, C13) and a third sequence (C20, C21, C22, C23), wherein each of the first, second and third sequences are orthogonal to each other;
generate a fourth sequence based on the first symbol, and the first sequence and the first cyclically shifted sequence; and
cause the terminal to transmit the fourth sequence to a base station,
wherein first two elements (C00, C01) of the first sequence are orthogonal to first two elements (C10, C11) of the second sequence, and last two elements (C02, C03) of the first sequence are orthogonal to last two elements (C12, C13) of the second sequence.

7. The terminal of claim 6, wherein:
the first sequence (C00, C01, C02, C03) comprises W0 (a, a, a, a), and the second sequence (C10, C11, C12, C13) comprises W1 (a, b, a, b), wherein a is a first value and b is a second value different from the first value.

8. The terminal of claim 7, wherein:
the first two elements (C00, C01) of the first sequence are also orthogonal to first two elements (C20, C21) of the third sequence, and the last two elements (C02, C03) of the first sequence are also orthogonal to last two elements (C22, C23) of the third sequence.

9. The terminal of claim 6, wherein the fourth sequence is generated by multiplying the first symbol with the first sequence and the first cyclically sifted sequence.

10. The terminal of claim 6, wherein the first symbol is generated based on acknowledgement/negative-acknowledgement (ACK/NAK) information.

11. A communication device for a terminal, the communication device comprising:
a circuitry which is configured to:
cause the terminal to receive information on cyclic shift;
generate a first cyclically shifted sequence based on the information on cyclic shift;
generate a first symbol;
select a first sequence from a first set of sequences, wherein the first set of sequences consists of the first sequence (C00, C01, C02, C03), a second sequence (C10, C11, C12, C13) and a third sequence (C20, C21, C22, C23), wherein each of the first, second and third sequences are orthogonal to each other;
generate a fourth sequence based on the first symbol the first sequence and the first cyclically shifted sequence; and
cause the terminal to transmit the fourth sequence to a base station,
wherein first two elements (C00, C01) of the first sequence are orthogonal to first two elements (C10, C11) of the second sequence, and last two elements (C02, C03) of the first sequence are orthogonal to last two elements (C12, C13) of the second sequence.

12. The communication device of claim 11, wherein:
the first sequence (C00, C01, C02, C03) comprises W0 (a, a, a, a), and the second sequence (C10, C11, C12, C13) comprises W1 (a, b, a, b), wherein a is a first value and b is a second value different from the first value.

13. The communication device of claim 11, wherein:
the first two elements (C00, C01) of the first sequence are also orthogonal to first two elements (C20, C21) of the third sequence, and the last two elements (C02, C03) of the first sequence are also orthogonal to last two elements (C22, C23) of the third sequence.

14. The communication device of claim 11, wherein the fourth sequence is generated by multiplying the first symbol with the first sequence and the first cyclically sifted sequence.

15. The communication device of claim 11, wherein the first symbol is generated based on acknowledgement/negative-acknowledgement (ACK/NAK) information.

* * * * *